United States Patent
Rennefeld et al.

(10) Patent No.: US 6,208,049 B1
(45) Date of Patent: Mar. 27, 2001

(54) MOTOR VEHICLE AUXILIARIES DRIVE ASSEMBLY

(75) Inventors: Alfons Rennefeld, Stuttgart; Juergen Friedrich; Karl-Ernst Noreikat, both of Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/917,313

(22) Filed: Aug. 25, 1997

Related U.S. Application Data

(62) Division of application No. 08/610,629, filed on Mar. 4, 1996, now abandoned.

(30) Foreign Application Priority Data

Mar. 3, 1995 (DE) ............................................. 195 07 434

(51) Int. Cl.⁷ ................................................ H02K 16/02
(52) U.S. Cl. ........................................ 310/75 R; 310/113
(58) Field of Search .................................... 310/75 R, 78, 310/155, 166, 179, 268, 103, 113, 114, 105; 318/66, 101, 127

(56) References Cited

U.S. PATENT DOCUMENTS

| | | | | |
|---|---|---|---|---|
| 3,337,122 | * | 8/1967 | Gross | 310/268 |
| 3,441,763 | * | 4/1969 | Patrignani | 310/268 |
| 4,603,271 | * | 7/1986 | Maruyama et al. | 310/62 |
| 4,875,110 | * | 10/1989 | Kazama et al. | 310/268 |
| 5,229,696 | * | 7/1993 | Golker et al. | 310/268 |
| 5,675,203 | * | 10/1997 | Schulze et al. | 310/113 |

FOREIGN PATENT DOCUMENTS

| | | |
|---|---|---|
| 2 254 390 | 5/1974 | (DE) . |
| 1 070 282 | 1/1975 | (DE) . |
| 28 14 884 | 10/1979 | (DE) . |
| 805 596 | 1/1987 | (DE) . |
| 88 11 100 U | 12/1988 | (DE) . |
| 43 33 907 A1 | 4/1995 | (DE) . |
| 2 258 737 | 8/1976 | (FR) . |
| 2 630 868 | 11/1989 | (FR) . |
| 1 193 965 | 6/1970 | (GB) . |
| 2 278 242 | 11/1994 | (GB) . |

OTHER PUBLICATIONS

W. Leonart, "Control of Electrical Drives", Springer Publishing Co., Heidelberg, pp. 286–295 (Jan. 1990).

* cited by examiner

*Primary Examiner*—Elvin Enad
*Assistant Examiner*—Tran N Nguyen
(74) *Attorney, Agent, or Firm*—Evenson, McKeown, Edwards & Lenahan, P.L.L.C.

(57) ABSTRACT

In a drive assembly for auxiliaries of a motor vehicle, such as fan drives, an electric motor serves as a clutch whose stator is non-rotatably connected with the driven shaft and whose rotor speed can be controlled with respect to the stator by controlling the stator excitation.

2 Claims, 1 Drawing Sheet

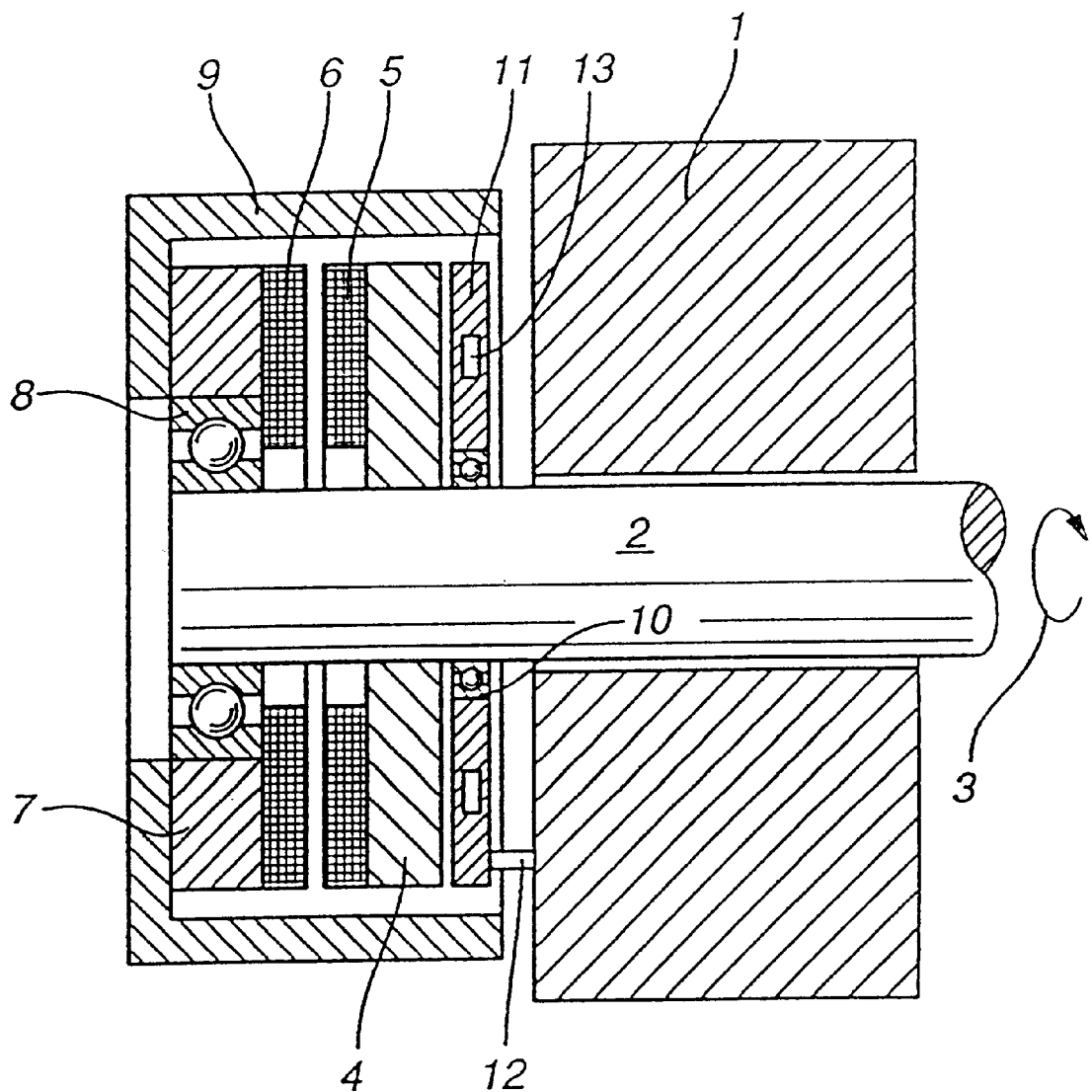

MOTOR VEHICLE AUXILIARIES DRIVE ASSEMBLY

This is a divisional of application Ser. No. 08/610,629, filed Mar. 4, 1996 now abandoned.

BACKGROUND AND SUMMARY OF THE INVENTION

The present invention relates to a drive assembly for auxiliaries of a motor vehicle, and more particularly, to a drive assembly having a driven shaft and a clutch arrangement by way of which the auxiliary is connected to the driven shaft, such as the fan of a motor vehicle engine.

DE-OS 22 54 390 shows the connection of a motor vehicle engine radiator fan by way of, for example, a magnetic clutch to the crankshaft of the engine. The magnetic clutch has a drive shaft which can be fixedly connected with the crankshaft, which forms the primary part of the clutch and can be coupled with a secondary part which is disposed in a freely rotatable manner and is connected with the fan wheel. A hysteresis disk is assigned to one clutch part and a magnet is assigned to the other clutch part. The working gap between the magnet and the hysteresis disk can be changed in the axial direction as a function of the rotational driving speed by way of a centrifugal governor. As a result, the transmissible torque can be increasingly lowered so that, at higher rotational engine speeds in which, as a rule, the driving speed is also higher, the driving power for the fan can be decreased.

DE-Gbm 88 11 100 also shows the connection of the radiator fan of a motor vehicle engine with the engine shaft by way of a fluid friction clutch. The fan, as a function of the cooling air temperature, optionally also as a function of the cooling water temperature, is driven faster or slower, specifically irrespective of how fast the engine is rotating. Both types of the aforementioned known constructions permit only a reduction of the rotational fan speed with respect to the drive shaft rotational speed.

FR 22 58 737 A also describes assigning rotatable coil arrangements to a shaft. These coil arrangements form a generator with a coil arrangement fixedly connected with the shaft. The generator can be driven, for example, by wind or water power. The use of an electric motor as a clutch for auxiliaries of motor vehicles, however, is not suggested by this known arrangement. DE-AS 10 70 282 describes an electric induction machine in which an electrodynamic clutch is connected between the induction machine and a power engine, with the two rotatable parts of the electrodynamic clutch carrying windings. A winding of the clutch and a polyphase winding of the electric induction machine in this case are connected to the same network. Such a development cannot be implemented for a drive assembly for an auxiliary of a motor vehicle.

It is an object of the present invention to provide a drive assembly such that the rotational speed for the drive of the auxiliary can be selected completely independently of the rotational speed of the driven shaft.

The foregoing object has been achieved in accordance with the present invention by providing a drive assembly in which an electric motor is used as a clutch arrangement. The stator of the electric motor is fixedly disposed on the driven shaft, and the rotational speed of the electric motor rotor is controllable by controlling the stator excitation with respect to the stator.

According to the stator excitation, the rotational speed of the rotor, on which, for example, the fan blades are fastened, can be reduced with respect to the rotational driving speed as was the case with prior art devices. With the present invention, it also becomes possible, however, to still increase the rotational rotor speed with respect to the rotational speed of the stator rotating along with the drive shaft so that, as a result, higher rotational speeds of the fan can also be implemented than can be provided by the drive shaft without switching on a high-expenditure transmission via clutches by merely using the electric motor as the clutch. The electric motor must only be configured for the difference of the maximally desired rotational fan speed and the rotational speed of the drive shaft because the stator rotates.

The rotor of the present invention can be placed directly onto the driven shaft. Between a housing receiving the driven shaft and the stator, in a further embodiment of the invention, an electronic power system can also be used for the control of the stator excitation which is expediently rotatably arranged on the driven shaft, is fixedly connected with the housing and configured to carry out the current transmission to the stator by way of slip rings.

BRIEF DESCRIPTION OF THE DRAWINGS

These and other objects, features and advantages of the present invention will become more readily apparent from the following detailed description thereof when taken in conjunction with the accompanying drawing wherein the single FIGURE is a schematic, partial cross-sectional elevation view of a drive shaft according to the present invention.

FIG. 1 is a schematic electronic power system circuit showing a conventional motor control for the electrical motor clutch arrangement shown in FIG. 1.

DETAILED DESCRIPTION OF THE DRAWINGS

A drive shaft 2 is disposed in a housing 1 and can be, for example, the end of the crankshaft of an internal-combustion engine. The shaft 2, which is driven in the direction of the arrow 3, has a disk non-rotatably flanged thereon to form the stator 4 of an electric motor and is provided with a first coil arrangement 5. A second coil arrangement 6 is provided opposite the coil arrangement 5 and is separated therefrom by an air gap. This second coil arrangement 6 is fixedly connected with a rotatable ring which forms the rotor 7 of the electric motor and which, rotatably by way of a ball bearing 8, is disposed on the shaft 2. The ring (stator 7) is connected with a bell jar 9 which surrounds the ring, its coil 6 and the stator disk 4 with the coil arrangement 5 on the outside.

By way of a ball bearing arrangement 10, a disk 11 is placed between the stationary housing 1 and the rotatable stator disk 4. A web 12 which is used as a torque support connects the disk 11 with the housing 1 and therefore stands still with respect to the latter. This disk 11 may accommodate an electronic power system which, for example, by way of the web 12, is electrically connected with corresponding feed lines in the housing 1 and, by way of conventional slip rings 14, 14' (not shown in detail), can establish the electric connection to the rotating stator 4.

The control of the stator excitation can therefore take place by way of an electronic power system 13 so that the rotational speed of the rotor 7 can be controlled with respect to the rotational speed of the stator 4. The rotational speed of the rotor 7 can be selected to be identical with the rotational speed of the stator 4 rotating along with the shaft 2. However, it may also be higher or lower. If, for example, the blades of a motor vehicle engine radiator fan are connected with the bell jar 9, the power consumption of this fan can be controlled arbitrarily according to which demands are made on the fan power. In this case, the electric motor formed by the stator 4 and the rotor 7 must be designed, for example, only for a rotational speed of 1,000 r.p.m. when a rotational speed of 2,000 r.p,m. is desired as the maximal rotational fan speed and the drive shaft 2 in the normal case rotates at 1,000 r.p.m. This permits a space-saving arrangement.

The present invention also offers the advantage that, when the bell jar 9 is fixed with respect to the rotating shaft 2, the arrangement can operate as a generator so that in this case energy can be stored when the shaft 2 rotates, without the requirement of having a fan drive or a drive of another auxiliary. Of course, not only the blades of a fan can be connected with the ball jar 9. It is within the scope of the present invention using known techniques to also drive the water pump or other auxiliaries via this bell jar 9 which may be equipped with, for example, a pulley.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for adjusting rotational speed of drive assembly for an auxiliary in which the drive assembly includes a driven shaft, a drive arrangement for connecting the auxiliary to the driven shaft, an electric motor having a stator fixedly disposed on the driven shaft, and a rotor, comprising the steps of controlling rotational speed of the rotor with respect to the stator, selectively connecting the auxiliary with the rotor via the drive arrangement, and selectively increasing and decreasing the rotor rotational speed independently to the driven shaft rotational speed to obtain a predetermined rotational speed for the auxiliary.

2. The process according to claim 1, wherein the auxiliary is employed in a motor vehicle.

* * * * *